(No Model.)

J. H. HEBBLETHWAITE.
SHAFT COUPLING.

No. 406,838. Patented July 9, 1889.

WITNESSES
Edwin T. Yewell.
Jos. A. Ryan

INVENTOR
John H. Hebblethwaite
By Manahan & Ward
Attorneys

UNITED STATES PATENT OFFICE.

JOHN H. HEBBLETHWAITE, OF ROCK FALLS, ILLINOIS, ASSIGNOR OF ONE-HALF TO JOSEPH WRIGHT, OF SAME PLACE.

SHAFT-COUPLING.

SPECIFICATION forming part of Letters Patent No. 406,838, dated July 9, 1889.

Application filed January 7, 1888. Serial No. 260,102. (No model.)

*To all whom it may concern:*

Be it known that I, JOHN H. HEBBLETHWAITE, a citizen of the United States, residing at Rock Falls, in the county of Whiteside and State of Illinois, have invented certain new and useful Improvements in Shaft-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to improvements in shaft-couplings; and it consists of certain novel mechanism adapted to form a rigid coupling between two shafts or sections thereof in whatever relation the joined parts may be placed. As a means of forming such junction when the connecting-shafts are placed perpendicular to each other, my invention is especially adapted for attaching the spindles of wheeled vehicles to runners, in order to afford a ready mode of converting a wheeled vehicle into a sled or sleigh.

As a means of joining the shafts or sections thereof when placed in the same line, my invention is adapted to rigidly connect and render practically integral portions and sections of ordinary line-shafting.

Figure 1:
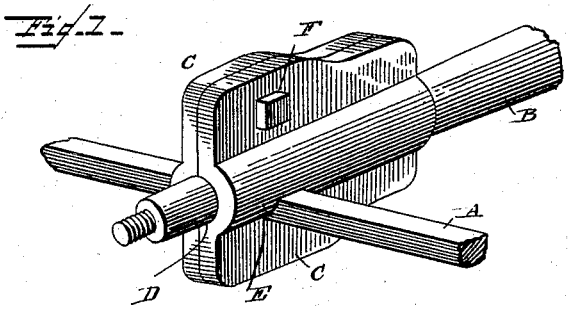
Figure 2:
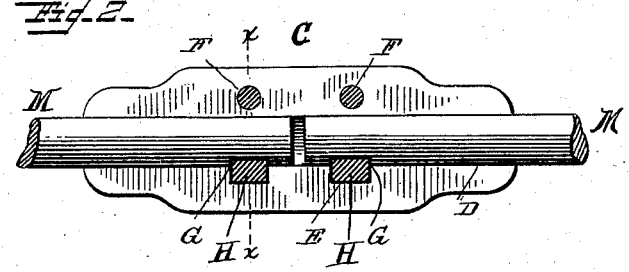
Figure 3:
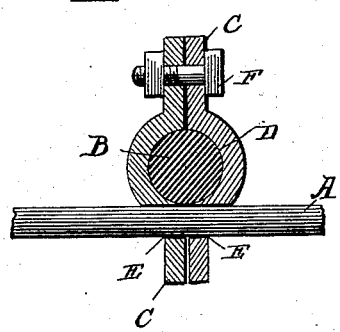

In the drawings, Figure 1 is a perspective of my invention as applied to connect the parts perpendicular to each other. Fig. 2 is a sectional view of my invention applied to connect shafts in the same line; Fig. 3, a cross-section of Fig. 1, and Fig. 4 a section on line *x x*, Fig. 2.

In Fig. 1 the bar A may be considered the rail or upper portion of a sled-runner, and the transverse spindle B the axle of a wheeled vehicle, and in the mode of application shown my invention is adapted to convert wheeled vehicles of all kinds, including children's carriages, express-wagons, and ordinary buggies and carriages, into sleds or sleighs by merely removing the wheels and placing the spindle B in relation with the bar A either above or below the latter, as shown in said Fig. 1.

C C are two similar pieces forming the clamp, having, respectively, centrally formed on their inner faces the longitudinal groove D, and there is also formed in the clamping-pieces C transverse lateral openings E, which form a passage through the clamping-pieces, when united, just below or on the lower edge of the said longitudinal groove D.

Referring to Fig. 1, the bar A is inserted through the openings E of the clamping-pieces C, and the spindle B is placed between the clamps C in the groove D and perpendicular to the bar A. The necessary compression of the clamping-pieces C is effected by one or more screw-bolts F, seated transversely in said clamps above the groove D, and not far from the upper edges of the clamping-pieces.

It is obvious that the compression exerted through the medium of the bolts F, at the upper side of the clamping-pieces C, will utilize the spindle B as a fulcrum, and tend to deflect outwardly the lower sides of the clamping-pieces C. The lower walls of the openings E are parallel with the under surface of the bar A, and the outward deflection referred to of the lower portion of said clamping-pieces tends to tightly compress the outer edges of said openings, respectively, against the contiguous lower surface of the bar A, and has the effect of lifting upward on said shaft and so tightly compressing said parts at the point referred to as to preclude any shifting of the clamping-pieces lengthwise on the bar A, and to form, in fact, a rigid connection between the latter and the spindle B.

In instances where the spindles of different axles are carried in wheels of different heights the same difference in the altitude of the respective axles can be secured and maintained by placing one of said axles under the bar A, in which contingency the clamping-pieces C would be inverted and placed in the same relation beneath the bar A that they are shown above the latter in Fig. 1.

The clamping-pieces C may be made any desired length, and thus be fitted for application to axles of different lengths in the same vehicle, as they sometimes occur in children's carriages.

In the drawings Figs. 1 and 3, the clamping-pieces are shown in but two directions, with the parts A and B in line with and perpendicular to each other; but by forming the opening E obliquely through the clamping-pieces C the bar A and spindle B may be joined at any angle to each other as may be desired.

The coupling shown in Fig. 2 is of the adjacent and contiguous ends of two shafts M in a line of shafting. These ends rest in the grooves D in clamping-pieces C. In line with the openings E in said clamps the lower surfaces of said shafts are cut away, forming transverse recesses G. A short bar or key H is inserted in each opening E and recess G—thus occupying in said clamps the position of bar A. (Shown in Figs. 1 and 3.) As the transverse bolts F above shafts M are tightened, the tendency of the lower or opposite sides of clamps C is to separate and move in opposite directions in arcs toward said bolts, fulcruming on said shafts. Because the keys H, when seated, are held in openings E snugly against the adjacent surface of said shafts, said keys H resist the said tendency of the lower parts of clamps C to respectively swing in arcs outward and toward said bolts, and such tendency results in pressing keys H more forcibly against shafts M. Thus the tightening of bolts F increases proportionately the pressure of keys H against the opposite sides of shafts M and holds the ends of the latter rigidly in said clamps. The recesses G prevent, respectively, the keys H from casually slipping on shafts M toward the longitudinal center of the latter.

Figure 4:
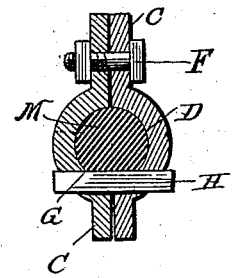

It is obvious that this invention, as above developed, is applicable to shafting, and how this can be done is illustrated in Figs. 2 and 4, wherein C represents the clamps; E, the openings in the same; F, the screw-bolts, H the bar fitting into the said openings, and M the ends of two shafts. These may or may not be recessed at G to match with opening E for the admission of the bar H. Excepting that there are two shafts instead of one, the construction and operation are the same in this instance as in Fig. 1, and the bar H, like bar A, is a locking-bar, and constitutes the means for binding the clamp together and upon the shaft, rail, or other like parts.

I do not intend in this application to limit my invention to any special use or uses, but desire to claim the same wherever it is applicable to effect a rigid junction of two contiguous shafts in any of their relative positions.

What I claim as my invention, and desire to secure by Letters Patent of the United States, is—

1. The within-described coupling device, consisting of a clamp made of two similar pieces, each centrally and longitudinally grooved, and secured together by bolt and nut devices near the upper edges and having lateral openings at the lower edge of the longitudinal groove, and locking means inserted therein, substantially as and for the purposes set forth.

2. The twin clamping-pieces C, each centrally and longitudinally grooved at D and having transverse openings E in the lower edge of the said groove for the admission of keys, combined with and compressed together by the bolts and nuts near the upper edges of the clamps, substantially as and for the purposes described.

In testimony whereof I affix my signature in presence of two witnesses.

JOHN H. HEBBLETHWAITE.

Witnesses:
JNO. F. BARRETT,
THEODORE H. MACK.